UNITED STATES PATENT OFFICE.

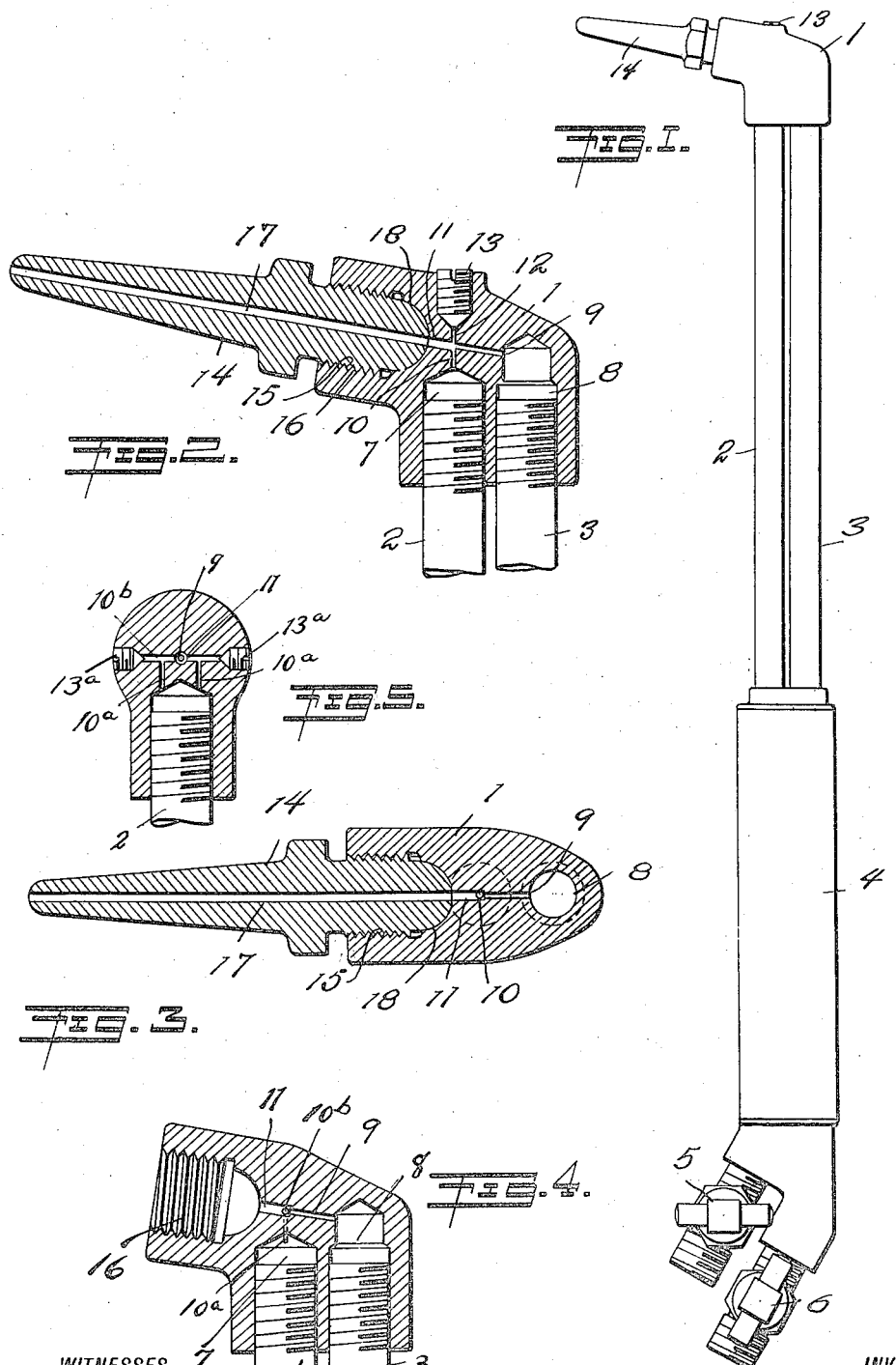

WORTHY C. BUCKNAM, OF JERSEY CITY, NEW JERSEY, ASSIGNOR TO DAVIS-BOURNON-VILLE COMPANY, OF NEW YORK, N. Y., A CORPORATION OF NEW YORK.

TORCH.

1,045,506.   Specification of Letters Patent.   Patented Nov. 26, 1912.

Application filed February 27, 1912. Serial No. 680,305.

*To all whom it may concern:*

Be it known that I, WORTHY C. BUCKNAM, a citizen of the United States, and a resident of Marion, Jersey City, in the county of Hudson and State of New Jersey, have invented certain new and useful Improvements in Torches, of which the following is a specification.

This invention relates to apparatus for welding or otherwise treating metals by means of a jet or jets of gases. It relates more particularly to apparatus or "torches" wherein the welding or heating of the metal is effected by a burning jet of very high temperature composed of oxygen and a combustible gas, such as, for example, acetylene, The construction of such apparatus has presented numerous problems, since the success of the process is absolutely dependent upon exact proportioning of the constituents of the jet, and calls for special attention with respect to the mixing provisions, means for effecting sure seals prohibiting premature mixing or leakage, the prevention of back-firing or the confining of back-fires to parts or passages where they will be harmless, and the elimination of chambers or reservoirs of any considerable capacity where the gases might collect so as either to aggravate the back-firing difficulty or to cause variation in the nature of the jet during the welding operation by expansion of such bodies of gas due to the increasing heat of the parts.

The object of this invention is to provide a device which will comply with all the necessary and desirable requirements of such apparatus and be capable of thoroughly satisfactory operation for the different kinds or grades of work within its range, and will be characterized by the utmost simplicity of construction, thereby making possible low cost of construction and great compactness of form, the latter being of importance for certain kinds of work.

The torch comprises a head, preferably supported by a handle connected thereto, conduits for oxygen and the combustible gas leading into the head, and a removable and replaceable tip, constituting one of a series having bores of different sizes for enabling the apparatus to deliver jets suitable for different kinds or grades of work. The head is an integral block or casting, and has provisions, in the nature of narrow intersecting bores, for bringing the two kinds of gases together in proper proportions. The removable and replaceable tip is secured to the head, preferably by being screwed directly thereto, and is provided with a sealing surface for contacting with the head and a single, longitudinal bore, supplied with a stream of the two kinds of gases by the bores in the head and serving to mix these gases as they flow and to deliver them as a jet upon the metal or metals to be welded or heated. The bores in the head are exactly proportioned with respect to the proportions ascertained as necessary for the constituents of the jet, and remain fixed, the change from one tip to another with a different size of bore and discharge orifice being accompanied by a proper change in the pressures of the two gases supplied to the conduits, so that the proper velocity of the stream flowing through the tip and issuing upon the work is always maintained, in order to prevent backward propagation of the flame and to secure the delivery of a proper quantity of gaseous mixture per unit time in that particular size of jet.

The invention will now be described with more particularity, reference being had to the accompanying drawings wherein:

Figure 1 is an elevation of a torch; Fig. 2 is a section through the head and tip thereof; Fig. 3 is a section at right-angles to the plane of Fig. 2; Fig. 4 is a section on a plane corresponding to that of Fig. 1 through a modified form of head; and Fig. 5 is a section at right-angles to Fig. 4.

The head 1 consists of a solid block of metal, being conveniently a casting. It is supported by a handle comprising the conduits or pipes 2, 3 and the cylindrical grip portion 4, through which the conduits or pipes may extend, the gases being kept entirely separate until after they enter the head. The rear ends of the conduits 2, 3 are provided with suitable nipples or the like for the connection of flexible tubes leading from the oxygen and acetylene tanks or other sources of supply. Valves 5, 6 are provided, as usual, for opening and closing the passages through the conduits 2, 3. The said conduits are secured to the head in any suitable manner, as by being screwed at their ends into tapped sockets 7, 8. These screw joints are permanent, that is, not to be taken apart in the ordinary course of use, and are made tight in any suitable or usual manner.

The head or block 1, or the body thereof, is preferably elongated, being disposed at such angle as is desirable for convenience in use by the operator. Two straight bores or drill-openings 9, 10 are formed in this head or block, the bore 9 being longitudinal and the bore 10 transverse. They lead from the conduits 3, 2, or the sockets 8, 7 therefor, and intersect at a wide angle. These two bores are properly proportioned, in accordance with the ascertained requisite proportions for the mixture and the pressures employed in the particular case. It is preferred to supply the gases to the head under equal pressures, and to make the ratio between the areas of the bores 9 and 10 the same as the ascertained ratio between the constituents. The bore 9, which leads oxygen to the point of intersection, has an extension 11 in direct line therewith for conducting the two gases from said point of intersection. This bore or extension 11 is preferably short, and is of proper cross-sectional area relative to the bores 9, 10, being, therefore, somewhat larger than the bore 9 of which it is an extension. The bore 10 preferably intersects the bores 9 and 11 at a wide angle, so as to promote the rapidity and thoroughness of mingling of the two gases. The bore 10 has an extension 12, preferably of the same diameter, which is accessible through the front of the head. The outer end of this extension 12 is closed by a removable screw plug 13 occupying a tapped socket of suitable size into which the extension 12 opens. In this manner, by the removal of the plug 13, a cleaning opening is afforded, through which a rod or wire may be passed through the entire length of the acetylene bore 10 for the purpose of removing accumulated carbon.

A removable and replaceable tip 14, constituting one of a series having bores of different cross-sectional areas and lengths is attached to the head by means of screw-threads 15 on the rear part thereof which engage with internal threads formed in a socket 16, into which the extension 11 of the bore 9 opens. The tip is provided with a single, longitudinal bore 17, for the proper mixing and discharge of the gases supplied by the bores in the head. This bore 17 preferably forms a straight-line continuation of the bores 9 and 11. The tip is formed with a suitable sealing surface 18, which contacts with a coöperating portion or surface on the head, to effect a leak-tight joint.

From the foregoing description the operation of the apparatus will be obvious to those skilled in the art. The bore 10, constituting the acetylene inlet passage, is preferably of such restricted cross-sectional area that backward propagation of flame through this passage into the acetylene conduit 2 is prevented.

In Figs. 4 and 5 there is illustrated another form of the invention, which may be used in conjunction with a range of tips having bores of larger sizes. With a single acetylene inlet in the head, sufficiently restricted to prevent back-firing at the lowest pressure and velocity of the entering acetylene appropriate to the bore in the smallest size of removable tip, the use of tips with materially larger bores might necessitate the employment of an undesirably high pressure for the acetylene. Accordingly, for tips with larger bores it is desirable to employ a head having more than one acetylene inlet passage, so that the cross-sectional area of each acetylene passage may be sufficiently restricted to guard against back-firing therethrough. In the construction shown in Figs. 4 and 5 two bores 10$^a$ are drilled from the socket 7 of the acetylene conduit transversely of the head in planes at opposite sides of the short combining bore or passage 11. These bores are connected with the oxygen inlet bore 9 and with the combining bore or passage 11 by means of a transverse bore 10$^b$ formed at right angles to the bores 10$^a$ and also to the oxygen inlet bore 9. Thus, each bore 10$^a$ and half of the bore 10$^b$ form a right angular acetylene inlet passage. The cross-sectional area of either the bore 10$^a$ or 10$^b$, or both, is sufficiently restricted so that back-firing therethrough is prevented. The bore 10$^b$ may extend at opposite ends through the outer side walls of the head, there being provided with clean-out screws or plugs 13$^a$. The form of tip used with this head is the same as was described in connection with Figs. 1 to 3. The form of head shown in Figs. 4 and 5 is not limited to use with tips of large bores only.

What I claim as new is:

1. A torch comprising a head formed of an integral block, conduits for a combustible gas and oxygen respectively leading into said head, and a tip removably attached to the head and having a longitudinal bore terminating in an outlet orifice, said head having mixing provisions comprising a bore communicating with the oxygen conduit and in line with the bore of the tip and a bore communicating with the combustible gas conduit and intersecting the other bore approximately at right angles, the gases being brought together by these provisions before entering the tip.

2. A torch suitable for welding metals, comprising a head formed of an integral block, conduits for oxygen and a combustible gas leading into said head, said head or block having a narrow bore for each kind of gas leading from said conduits and intersecting at a wide angle, one of said bores having a short extension of larger cross-section extending beyond the point of intersection and opening through the head, the other bore also having an extension beyond the point of intersection, a plug removable from the outside of the head closing the outer end of the latter extension, and a tip removably secured to the head and being formed with a longitudinal mixing and discharge bore forming a continuation of the former extension.

3. A torch comprising an integral head having a socket, a one-piece tip removably held in said socket and having a longitudinal bore extending from end to end and terminating in a jet mouth, and conduits for oxygen and a combustible gas respectively leading into said head, said head having an opening at the back of its socket communicating with the rear end of said bore in the tip, and mixing provisions formed in the head and comprising a bore communicating with the oxygen conduit and terminating in said opening, being in line with the bore of the tip, and a bore communicating with the combustible gas conduit and leading directly into the oxygen stream at an angle, the last-named bore communicating with said socket only through said opening.

In witness whereof I have signed my name in the presence of two subscribing witnesses.

WORTHY C. BUCKNAM.

Witnesses:
J. F. BRANDENBURG,
B. W. COULDOCK.